Figure 1:
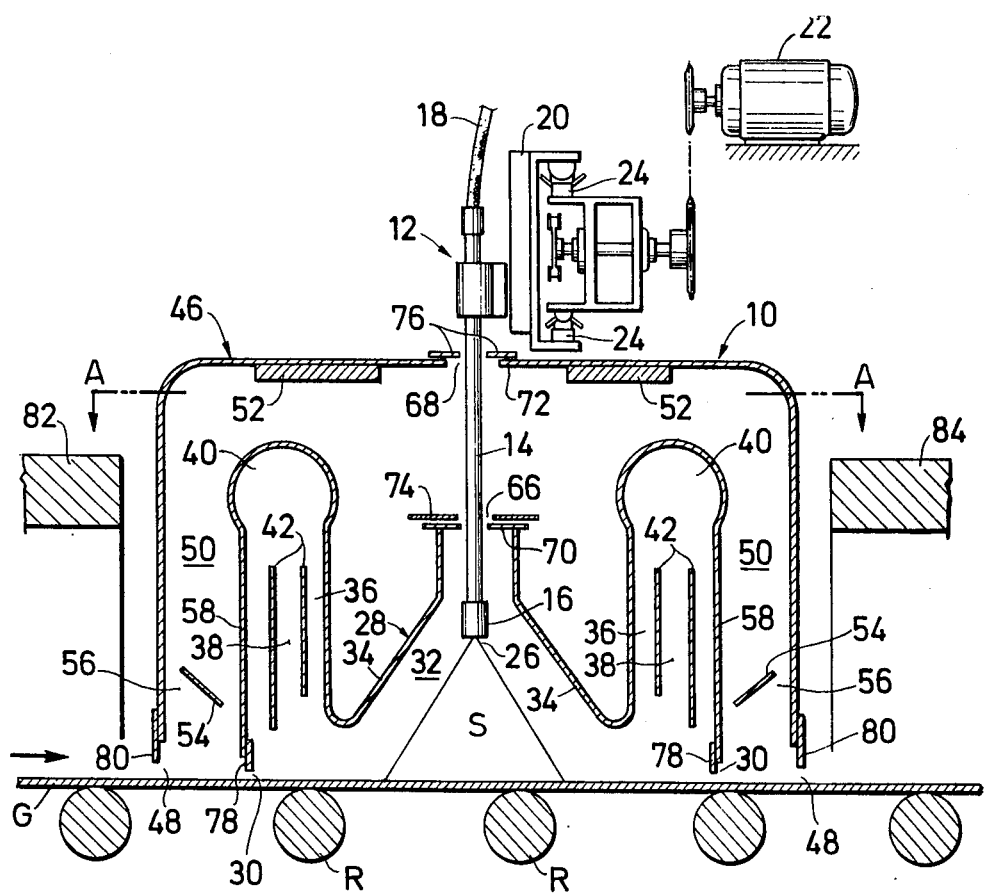

United States Patent [19]
Chujo et al.

[11] 4,064,832
[45] Dec. 27, 1977

[54] APPARATUS FOR FABRICATING HEAT-REFLECTING GLASS

[75] Inventors: Yoshimasa Chujo, Musashino; Takayoshi Kandachi, Matsusaka, both of Japan

[73] Assignee: Central Glass Company, Limited, Ube, Japan

[21] Appl. No.: 671,433

[22] Filed: Mar. 29, 1976

[30] Foreign Application Priority Data

Mar. 29, 1975 Japan ................................. 50-38143

[51] Int. Cl.$^2$ ........................ B05C 5/00; B05C 15/00
[52] U.S. Cl. .................................... 118/323; 118/326
[58] Field of Search ............... 118/323, 326, 634, 315, 118/DIG. 7; 427/424

[56] References Cited

U.S. PATENT DOCUMENTS

| | | | |
|---|---|---|---|
| 3,841,858 | 10/1974 | Akashi et al. | 118/323 X |
| 3,885,066 | 5/1975 | Schwenninger | 118/323 X |

Primary Examiner—John P. McIntosh
Attorney, Agent, or Firm—Fleit & Jacobson

[57] ABSTRACT

A method and apparatus for controlling the temperature of a spraying zone in a process of fabricating heat-reflecting glass sheets by a traversing spraying means which is located over a transfer line of a hot glass sheet. The spraying zone is enclosed in an inner hood, which is in turn housed in an outer enclosure to provide a substantially closed heat-controlling space on the outer side of the inner hood.

5 Claims, 2 Drawing Figures

APPARATUS FOR FABRICATING HEAT-REFLECTING GLASS

This invention relates to apparatus for fabricating heat-reflecting glass, and more particularly to improvements providing means for adjusting the temperature of an atmosphere surrounding a spray-coating zone on one surface of an elongated glass sheet.

In the production of heat-reflecting glass, it is known to form a metal oxide film on one surface of a hot glass sheet which is being transferred on a conveyer, by spraying a solution of a metal compound with use of a spraying means which is reciprocably movable in a transverse direction relative to the length of the moving glass sheet while forcibly exhausting a decomposition gas of the metal compound through suction ducts which are provided on opposite sides of the transverse passage of the reciprocating spraying means. Upon spraying a solution of a metal compound onto a hot glass surface, the metal compound is decomposed into a corresponding metal oxide with an attendant decomposition gas. The decomposition gas is therefore forcibly removed and discharged from the spraying zone by the suction means. In the process of forming a metal oxide film on the glass surface by the use of an apparatus of the type mentioned above, however, it has been found that optical characteristics of the coated metal oxide film are greatly influenced by the atmospheric temperature of the spraying zone and also by the exhaust temperature which reflects changes in the atmospheric temperature. Presumably, this is because the timing, rate, etc. of the decomposition reaction of the metal compound to be coated on the glass surface are delicately influenced by the atmospheric temperature of the spraying zone. Therefore, the atmospheric temperature of the spraying zone should suitably be maintained constantly at a level as high as 100° C to 350° C.

There have been hitherto proposed several methods for controlling such atmospheric temperature, including a method which maintains a high atmospheric temperature by oxidation combustion of the solvent which dissolves the metal compound while feeding an oxygen gas-containing gas into the spraying zone. The temperature control is also attained by a method which employs a hot gas blowing means for injecting a hot gas at a predetermined rate into the spraying zone from a combustion device which is provided separately from the spray-coating apparatus. However, the former method is susceptible to dangerous accidents such as firing and explosion in the spraying zone since a combustible solvent is invariably brought into contact with the hot glass sheet. On the other hand, the latter method also has inherent problems such as the difficulty of providing a hot gas-blowing device in the narrow limited space of the spraying zone and the complication of the apparatus construction and is disadvantageous from a viewpoint of heat energy consumption.

It is therefore an object of the present invention to provide apparatus for spray-coating a heat-reflecting film on a hot glass sheet, which overcomes the above-mentioned problems and difficulties.

It is another object of the present invention to provide apparatus of the class just mentioned, which is provided with means for controlling the atmospheric temperature of the spraying zone suitably to form a metal oxide coating of desired optical characteristics on a glass sheet.

There is disclosed a method for controlling the temperature of the spraying zone during the process of fabricating heat-reflecting glass by coating a solution of a metal compound on one side of a glass sheet by means of a transversely reciprocating spraying means which is located over a transfer line of a hot elongated glass sheet. According to the disclosure, the spraying zone is enclosed in an inner hood which has exhaust gas passages for discharging and removing the exhaust gas which is generated by the decomposition of the sprayed metal compound. The inner hood is in turn enclosed in an outer enclosure which defines a heat controlling space on the outer side of the inner hood for maintaining the temperature of the spraying zone at a suitable level and preventing cold air from directly entering the spraying zone. The heat controlling space may be heated positively by a suitable heating means to maintain the spraying zone at a high temperature level of 100° C to 350° C, preferably 150° C to 350° C. By controlling the spraying zone at such high temperature level, a metal oxide film of excellent optical properties can be formed on the glass sheet surface.

According to the invention, there is also provided an apparatus for carrying out the method described above, which comprises a spraying means supported over a transfer line of a hot elongated glass sheet and reciprocably movable in a transverse direction for spraying a solution of a metal compound onto the upper surface of the glass sheet entering a spraying zone, an inner hood having a downwardly diverging intermediate portion enclosing the spraying zone and upright end portions forming exhaust gas passages on the front and rear sides of the spraying zone for the exhaust gas to be purged from the spraying zone, exhaust ducts leading outwardly from the upper ends of the exhaust gas passages for discharging the exhaust gas therethrough, and an outer enclosure enclosing the inner hood and defining a heat controlling space, the inner hood and outer enclosure each having a transverse slit in the top wall thereof for receiving the transversely reciprocating spraying means.

With the apparatus according to the invention, the spraying zone temperature can be maintained at a suitable level throughout the spray-coating process without being influenced by room or ambient temperature. In order to maintain a high spraying zone temperature, a heating unit or units may be provided within the heat controlling space between the inner hood and the outer enclosure.

The present invention has a number of prominent advantages from an industrial point of view. Firstly, it is possible to effect the spray-coating under controlled temperature conditions. The apparatus is simple in construction and operation, and the heat-reflecting glass sheets obtained by the method and apparatus of the invention are uniform and excellent in quality.

Figure 2:
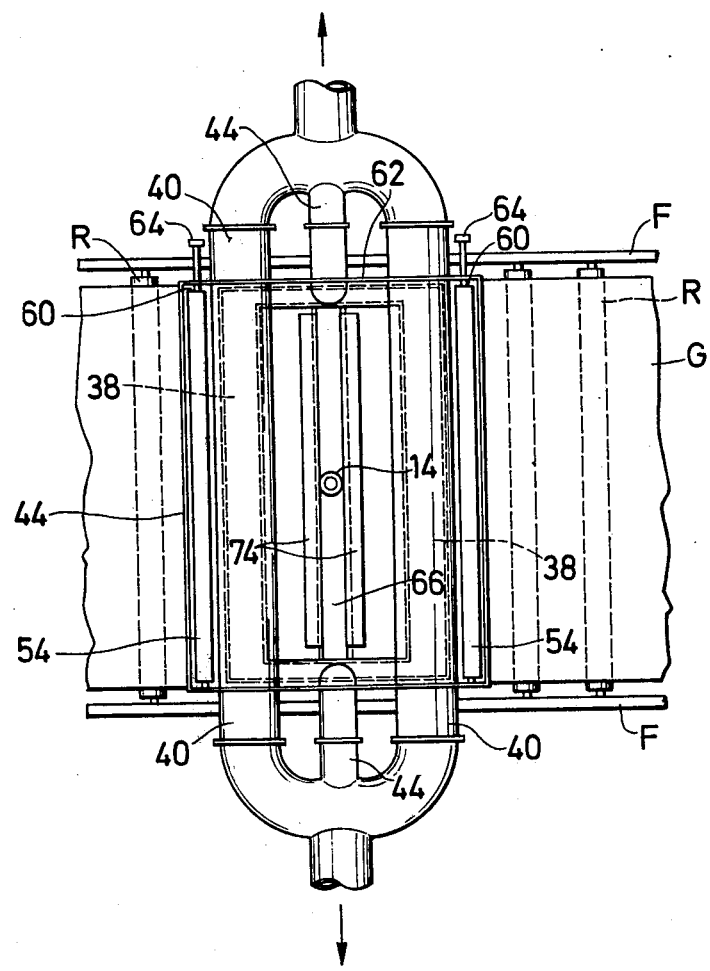

The invention will be fully understood from the following particular description of preferred embodiments and appended claims, taken in conjunction with the accompanying drawings, in which:

FIG. 1 is a diagrammatic view, partially in longitudinal section, of a heat-controlled spray-coating apparatus according to the invention; and FIG. 2 is a sectional view taken along line A—A of FIG. 1.

Referring now to FIGS. 1 and 2, generally designated at 10 is an apparatus which is employed for carrying out the heat-controlled spray-coating method of the invention. The apparatus 10 includes a spraying means which may be in the form of a spray gun 12 having a neck portion 14 extending downwardly toward a point overhead a hot glass sheet G which is being transferred on a roller conveyer R with a frame F and a spraying head 16 which is provided at the lower end of the neck portion 14. The spray gun 12 is connected to a storage tank (not shown) which holds a solution of a metal compound, through a suitable conduit means such as a flexible tube indicated at 18.

The spray gun 12 is supported on a carriage 20 which is driven from a motor 22 to move reciprocatingly along rails 24 to impart transverse movements to the spray gun 12 relative to the glass sheet G, reversing the spraying head 12 at the opposite sides of the glass sheet G in the usual manner. A spraying zone 26 which contains the spray cone S and the reciprocating spraying head 16 is enclosed in an inner hood 28 which is fixedly supported over the glass sheet G leaving a predetermined bottom gap space 30 therebetween. The inner hood 28 includes an intermediate portion 32 having downwardly diverging walls 34 which house the spraying zone 26 and upright end portions 36 at opposite sides of the intermediate portion 32. The opposite end portions 36 form exhaust gas passages 38 which communicate at the lower ends with the spraying zone 26 and open at the upper ends into main exhaust gas ducts 40. The upright exhaust passages 38 may each include a baffle plate or plates 42 to regulate and uniformalize the flow of exhaust gas. The main exhaust gas ducts 40 are extended parallel with the upright end portions 36 of the inner hood 28 and may further include branch ducts 44 which extend to the opposite ends of the intermediate portion 32 to suction or collect the exhaust gas which otherwise tends to escape from the opposite ends of the intermediate portion 32. The exhaust duct includes a fan (not shown) in the usual manner to suction the exhaust gas through the main and branch exhaust ducts 40 and 44.

The inner hood 28 is in turn enclosed in an outer enclosure 46 generally of a rectangular form which is supported by suitable means with the lower end establishing a small gap 48 in relation with the moving glass sheet G to form a substantially closed heat-controlling space 50 on the outer side of the inner hood 28, thus blocking cold air which would otherwise creep into the spraying zone 26 directly through the bottom gap space 30 between the lower end of the inner hood 28 and the glass sheet G. A suitable number of heating units 52 may be mounted on the inner wall surfaces of the outer enclosure 46 for positively heating from outside the spraying zone 26. Movable damper plates 54 are provided in the lower portions of the spaces 56 between the outer walls 58 of the upright end portions 36 and the outer enclosure 46 to regulate the amount of air to be introduced into the heat-controlling space 50. The damper plate 54 may be mounted on a shaft 60 which is journalled in the side walls 62 of the outer enclosure 46 and has a knob 64 to facilitate manupilation from outside.

The inner hood 28 and the outer enclosure 46 have transversely extending elongated slots 66 and 68 in the respective top walls 70 and 72 to receive the downwardly extending neck portion 14 of the transversely reciprocating spray gun 12 and to guide the traversing movements thereof. Slidable adjusting plates 74 are mounted on the top wall 70 of the intermediate portion 32 on opposite sides of the neck portion 14 of the spray gun 12 to adjust the width of the slot 66. In a similar manner, slidable adjusting plates 76 are mounted on the top wall 72 of the outer enclosure 46 on opposite sides of the neck portion 14 of the spray gun 12 to adjust the width of the slot 68.

Moreover, adjusting plates 78 and 80 are adjustably provided at the lower ends of the upright end portions 36 of the inner hood 28 and the outer enclosure 46, respectively on the front and rear sides of the spraying zone 26, to adjust the width of the bottom gap spaces 30 and 48 from the hot glass sheet G on the transfer line.

The adjusting plates 74, 78 and 80 are made of, for example, flexible heat-resistant material such as asbestos cloth, so that there is no possibility of damaging the glass sheet G or the neck portion 14 of the spray gun 12 upon contact therewith.

In operation, the hot glass sheet G which has been formed and heated to a predetermined temperature in a heating furnace schematically shown at 82 is continuously transferred by the conveyor rolls R in the direction of the arrow in FIG. 1. Indicated at 84 is an annealing oven in which the hot glass sheet G having a coated metal oxide film on one surface thereof is annealed. The metal oxide coating apparatus 10 of the invention is usually interposed between such heating furnace and annealing oven.

Upon entering the spraying zone 26, a solution of a metal compound is sprayed over the entire width of the hot glass sheet G by the spray gun 12 which is held in traversing movements in synchronism with the transfer speed of the hot glass sheet G. By contact with the hot surface of the glass G, the metal compound is thermally decomposed into a corresponding metal oxide, forming a metal oxide coating on the glass surface. Examples of the metal compounds useful in the practice of the invention include acetates of chromium, iron, cobalt, nickel, tin, aluminum and the like metals, acetylacetonato complexes of metals, aliphatic acid esters of metals and mixtures thereof. To prepare the spraying solution, these metal compounds are dissolved in suitable solvents such as alcohols, benzene, toluene, methylene chloride, pyridine and the like.

The gas which is generated by the thermal decomposition of the metal compound is discharged and removed from the spraying zone 26 through the exhaust gas passages 38 in the upright end portions 36 of the inner hood 28 which substantially completely encloses the spraying zone 26, suckingly taking supplementary air from outside through the bottom gap space 30 between the inner hood 28 and the moving glass sheet G and at the same time through the transverse slot 66. Excessive cooling of the spraying zone due to cold air entering directly from outside is prevented by the provision of the heat-controlling space 50 which is enclosed by the outer enclosure 46 on the outer side of the inner hood 28. The air in the heat-controlling space 50 is heated by heat radiation of the hot glass sheet G. If desired, the upper portions of the heat-controlling space 50 may be heated by a suitable number of heating units 52 to maintain a relatively high temperature level of the air to be drawn into the spraying zone 26 through the transverse slot 66 in the top wall 70 of the inner hood 28. The amount of air entering the heat-controlling space 50 is controlled by adjusting the adjusting plates 80 and dampers 54. Moreover, the amount of temperature controlled air to be drawn into the spraying zone 26 through the slot 66 is controllable by adjusting the level of the adjusting plates 74. In addition, the amount of air which flows into the inner hood 28 from the heat-controlling space 50 through the bottom gap space 30 is adjusted by the adjusting plates 78 on the outer walls 58 of the end portions 36 of the inner hood 28. The amount of heated air flowing into the spraying zone 26 through the transverse slot 66 in the top wall 70 of the intermediate portion 32 is closely related with the width of the bottom gap space 30.

As will be understood from the foregoing description, the temperature of the spraying zone 26 enclosed by the inner hood 28 can be maintained at an optimumly high level of 100° C to 350° C by controlling the air temperature in the heat controlling space 50 within the outer enclosure 46 as well as the amounts of air to be drawn into the spraying zone 26 through the transverse slot 66 and the bottom gap space 30, respectively.

What is claimed is:

1. An apparatus for fabricating heat-reflecting glass comprising a spraying means supported over a transfer line of a hot elongated glass sheet and reciprocably movable in a transverse direction for spraying a solution of a metal compound onto the upper surface of the glass sheet entering a spraying zone, an inner hood having a downwardly diverging intermediate portion enclosing said spraying zone and upright end portions forming exhaust gas passages on the front and rear sides of said spraying zone for the exhaust gas to be purged from said spraying zone, exhaust ducts leading outwardly from the upper ends of said exhaust gas passages for discharging the exhaust gas therethrough, and an outer enclosure enclosing said inner hood and defining therebetween a heat controlling space thereby maintaining the temperature of said spraying zone at a suitable level and preventing cold air from directly entering said spraying zone, said inner hood and said outer enclosure each having a transverse slot in the top wall thereof for receiving and guiding the transversely reciprocating spraying means.

2. An apparatus according to claim 1, wherein said outer enclosure includes at least one heating unit within the heat controlling space between said inner hood and said outer enclosure.

3. An apparatus according to claim 1, further comprising movable damper plates which are provided in the lower portions of the spaces between the outer walls of said upright end portions and said outer enclosure to regulate the amount of air to be introduced into said heat-controlling space.

4. An apparatus according to claim 1, wherein said inner hood includes slidable adjusting plates which are mounted on the top wall of said intermediate portion on opposite sides of a neck portion of said spraying means to adjust the width of said slot.

5. An apparatus according to claim 1, wherein said inner hood and said outer enclosure each includes adjusting plates at the lower ends opposing said glass sheet at a gap space therefrom on the front and rear sides of said spraying zone, thereby to adjust the width of said gap space.

* * * * *